J. M. CRUCET.
RELIEF ORNAMENT AND METHOD OF MAKING THE SAME.
APPLICATION FILED FEB. 19, 1915.
1,154,384.
Patented Sept. 21, 1915.
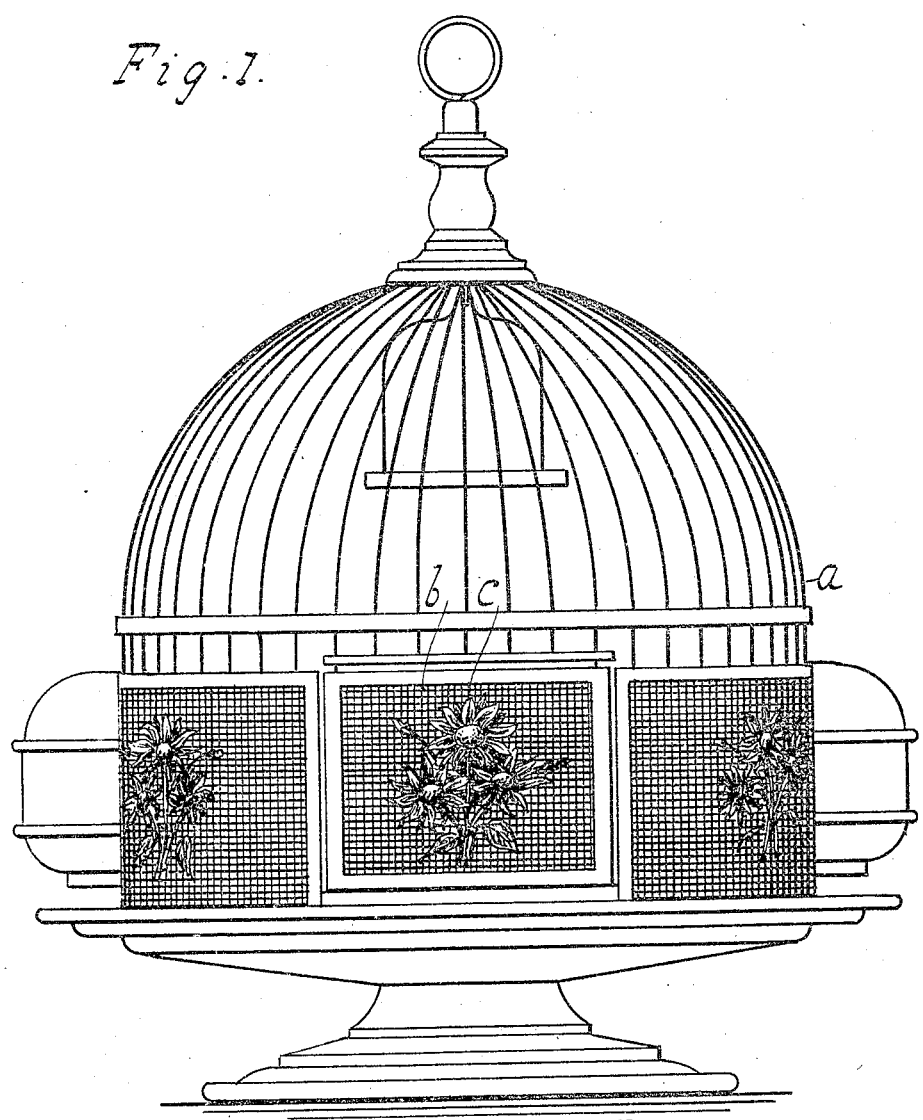
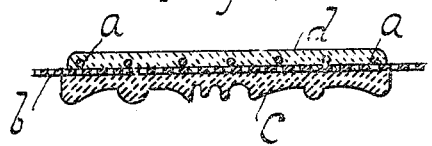
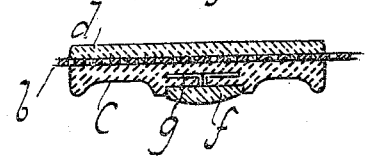

UNITED STATES PATENT OFFICE.

JOSEPH M. CRUCET, OF NEW YORK, N. Y.

RELIEF ORNAMENT AND METHOD OF MAKING THE SAME.

1,154,384. Specification of Letters Patent. Patented Sept. 21, 1915.

Application filed February 19, 1915. Serial No. 9,342.

*To all whom it may concern:*

Be it known that I, JOSEPH M. CRUCET, a citizen of the United States, residing at New York, in the county of New York and State of New York, have invented new and useful Improvements in Relief Ornaments and Methods of Making the Same, of which the following is a specification.

This invention relates to the method of fastening a bas-relief ornament on a reticulated or foraminous article.

The object of the invention is to mold a plastic composition and securely fasten the ornamental molded figure on the face of a woven wire or perforated article. The composition can be shaped to any configuration to represent a botanical, art or other symmetrical design.

The novel features of the invention are more fully described in the following specification and claims and illustrated in the accompanying drawing in which:

Figure 1 represents a side elevation showing the invention applied to a bird cage. Fig. 2 is a detail horizontal section of the ornament on a larger scale. Fig. 3 is a similar section of a modification.

In this drawing the letter *a* designates the vertical wires of a bird cage, and *b* is a section of wire mesh mounted on the lower portion of the cage. On this wire mesh is mounted a composition relief ornament *c* having a back *d* of the same composition united to the rear portion of the ornament, for engagement with the back of the mesh and the wires of the cage.

As shown in Fig. 3 the plastic composition ornament *c* is arranged onto a foundation of wire *b* and the back slab of composition *d* serves to lock the ornament to the wire as described above. In this design the ornament is provided with a jewel *f* mounted in the composition and held therein by a wire *g* embedded in the composition.

The relief ornament is composed of whiting with a suitable binder, such as glue. The binding ingredients are heated and the whiting is gradually and thoroughly mixed with the same. This plastic substance is pressed into molds and the ornaments thus formed are subjected to moist heat on the back thereof until quite soft, then they are applied and pressed on to the object to be decorated. After this another batch of the same plastic substance is softened by moist heat to a pulpy condition and pressed on to the back of the article until the two masses of composition amalgamate.

It will be understood that when the back of the composition ornament has been softened and pressed on to the wire mesh some of the substance will ooze through the interstices of the mesh, then when the second plastic heated mass is pressed onto the back of the ornament it will unite with the same thereby forming a homogeneous mass to firmly lock the ornament to the wire mesh.

I claim:

1. In a relief ornament the combination with a wire mesh and a series of wires backing the mesh, of a composition relief ornament arranged on the mesh, and a second plastic composition disposed onto the back of the ornament forming a homogeneous mass to lock the ornament to the mesh and the wires.

2. In a relief ornament the combination with a wire mesh article, of a composition relief ornament arranged on the article, a jewel embedded in the ornament, and a composition united to the back of the ornament and the mesh for fastening the ornament.

3. The method of fastening composition relief ornaments to a foraminous object, which consists in heating the back of the ornament after it is molded, and then pressing the same on to the object so that the back of the ornament will engage the interstices of the object.

4. The method of fastening composition of whiting relief ornaments to a foraminous object, which consists in heating the back of the ornament after it is molded, then pressing the same onto the object so that the back of the ornament will interlock in the interstices of the object, and then heating another batch of the whiting composition disposing it on the back of the article to unite with the back of the ornament.

In testimony whereof I have hereunto set my hand in the presence of two subscribing witnesses.

JOSEPH M. CRUCET.

Witnesses:
CHRISTIAN H. AHNSTAEDT,
HAZEL V. REIDENBACH.